US010893410B2

United States Patent
Salkintzis

(10) Patent No.: US 10,893,410 B2
(45) Date of Patent: *Jan. 12, 2021

(54) METHOD AND DEVICE FOR ESTABLISHING A PEER-TO-PEER CONNECTION IN A MOBILE COMMUNICATION NETWORK

(71) Applicant: MOTOROLA MOBILITY LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,481

(22) Filed: Jun. 18, 2020

(65) Prior Publication Data

US 2020/0322789 A1 Oct. 8, 2020

Related U.S. Application Data

(63) Continuation of application No. 15/079,658, filed on Mar. 24, 2016, now Pat. No. 10,728,748.

(51) Int. Cl.
*H04W 76/14* (2018.01)
*H04W 8/26* (2009.01)
*H04W 76/12* (2018.01)
*H04W 4/70* (2018.01)

(52) U.S. Cl.
CPC .......... *H04W 8/265* (2013.01); *H04W 76/14* (2018.02); *H04W 4/70* (2018.02); *H04W 76/12* (2018.02)

(58) Field of Classification Search
CPC ....... H04W 8/265; H04W 76/14; H04W 4/70; H04W 76/12
See application file for complete search history.

(56) References Cited

U.S. PATENT DOCUMENTS

| 9,723,643 B2 | 8/2017 | Gattami et al. |
|---|---|---|
| 2004/0013099 A1 | 1/2004 | Oneill |
| 2008/0019387 A1 | 1/2008 | Kim et al. |
| 2009/0016232 A1 | 1/2009 | Kwon et al. |
| 2010/0009675 A1 | 1/2010 | Wijting et al. |

(Continued)

FOREIGN PATENT DOCUMENTS

| CN | 101742690 A | 6/2010 |
|---|---|---|
| WO | 2010028690 A1 | 3/2010 |

(Continued)

OTHER PUBLICATIONS

International Search Report and Written Opinion for WO Application PCT/US2017/023978 dated Jun. 30, 2017.

(Continued)

*Primary Examiner* — Marcus Hammonds

(57) ABSTRACT

A network element of a core network receives a connectivity request for a first peer device. The connectivity request includes an indication for establishing a peer-to-peer connection for the first peer device to communicate data packets with a second peer device. The network element sends, to a first base station of an access network, an access network bearer setup request, which includes an address for the first peer device and serves as a request for the first base station to establish, for the peer-to-peer connection, an access network bearer in the access network for use in communicating the data packets with the second peer device without the use of a core network bearer.

12 Claims, 12 Drawing Sheets

(56) References Cited

U.S. PATENT DOCUMENTS

| | | |
|---|---|---|
| 2011/0294474 A1 | 12/2011 | Barany et al. |
| 2011/0296719 A1 | 12/2011 | Sories et al. |
| 2012/0314689 A1 | 12/2012 | Wang |
| 2013/0258967 A1 | 10/2013 | Watfa et al. |
| 2013/0287012 A1 | 10/2013 | Pragada et al. |
| 2013/0297810 A1 | 11/2013 | Ho et al. |
| 2013/0308598 A1 | 11/2013 | Madan et al. |
| 2013/0315079 A1 | 11/2013 | Edge |
| 2014/0146739 A1 | 5/2014 | Zhang et al. |
| 2014/0370922 A1 | 12/2014 | Richards |
| 2015/0281953 A1 | 10/2015 | Liu et al. |
| 2016/0007316 A1 | 1/2016 | Vaidya et al. |
| 2016/0044726 A1 | 2/2016 | Enomoto et al. |
| 2016/0057730 A1 | 2/2016 | Truelove et al. |
| 2016/0087810 A1 | 3/2016 | Zhang et al. |
| 2016/0119762 A1 | 4/2016 | Zhu et al. |
| 2016/0157147 A1 | 6/2016 | Saghir et al. |
| 2016/0192266 A1 | 6/2016 | Dai et al. |
| 2016/0219639 A1 | 7/2016 | Agiwal et al. |
| 2016/0255554 A1 | 9/2016 | Ke et al. |
| 2016/0309448 A1 | 10/2016 | Truelove et al. |
| 2016/0323922 A1 | 11/2016 | Park et al. |
| 2017/0019833 A1 | 1/2017 | Luo et al. |
| 2017/0055152 A1 | 2/2017 | Zhang |
| 2017/0238121 A1 | 8/2017 | Thiebaut et al. |

FOREIGN PATENT DOCUMENTS

| | | |
|---|---|---|
| WO | 2012058817 A1 | 5/2012 |
| WO | 2015124104 A1 | 8/2015 |

OTHER PUBLICATIONS

International Search Report and Written Opinion for WO Application PCT/US2017/023979 dated Jul. 6, 2017.

Gohar Moneeb, et al., "TRILL-Based Mobile Packet Core Network for 5G Mobile Communication Systems", Wireless Personal Communications, Springer, Dordrecht, NL, vol. 87, No. 1, Aug. 20, 2015, 125-144.

FIG. 5

| PEER DEVICE 502 | PEER DEVICE ADDRESS 504 | SERVING eNB 506 | SERVING eNB ADDRESS 508 |
|---|---|---|---|
| UE-B | IP OR LAYER-2 ADDRESS-1 | eNB-B | eNB IP ADDRESS-1 |
| UE-C | IP OR LAYER-2 ADDRESS-2 | eNB-C | eNB IP ADDRESS-2 |
| UE-D | IP OR LAYER-2 ADDRESS-3 | eNB-A | eNB IP ADDRESS-3 |
| IoT DEVICE-A | IP OR LAYER-2 ADDRESS-4 | eNB-D | IoT IP ADDRESS-4 |

FORWARDING TABLE FOR eNB-A 500, 510, 512, 514, 516, 518

FORWARDING TABLE FOR eNB-A
500

| PEER DEVICE 502 | PEER DEVICE ADDRESS 504 | SERVING eNB 506 | SERVING eNB ADDRESS 508 |
|---|---|---|---|
| UE-B | IP OR LAYER-2 ADDRESS-1 | eNB-C *1002* | eNB IP ADDRESS-2 *1004* |
| UE-C | IP OR LAYER-2 ADDRESS-2 | eNB-C | eNB IP ADDRESS-2 |
| UE-D | IP OR LAYER-2 ADDRESS-3 | eNB-A | eNB IP ADDRESS-3 |
| IoT DEVICE-A | IP OR LAYER-2 ADDRESS-4 | eNB-D | IoT IP ADDRESS-4 |

Row labels: 510, 512, 514, 516, 518

*FIG. 10*

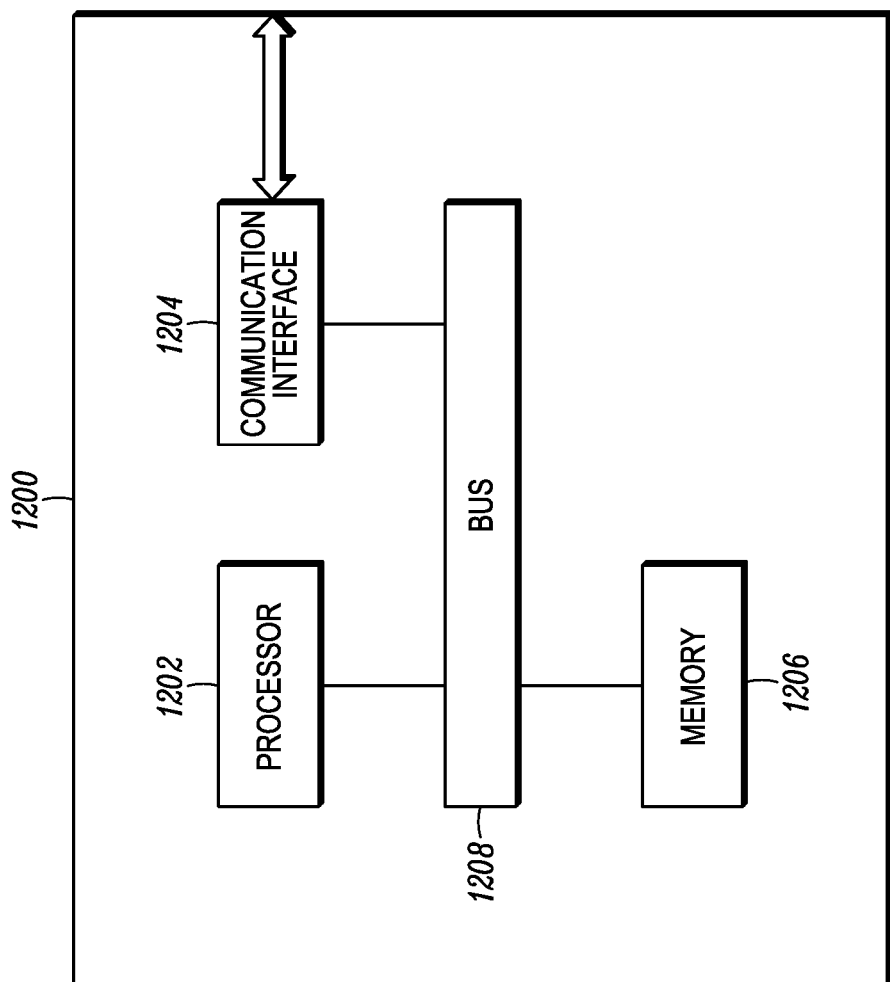

METHOD AND DEVICE FOR ESTABLISHING A PEER-TO-PEER CONNECTION IN A MOBILE COMMUNICATION NETWORK

FIELD OF THE DISCLOSURE

The present disclosure relates generally to wireless communication and more particularly to a method and device for establishing a peer-to-peer connection in a mobile communication network.

BACKGROUND

5th generation (5G) mobile communication networks and wireless systems denote the next major phase of mobile telecommunications standards beyond the current 4G standards. Expected features of 5G networks include the capability of supporting very large numbers, e.g., billions, of wireless "peer" devices including smartphones, machine-to-machine (M2M) devices, Internet-of-Things (IoT) devices, sensors, etc. As used herein, peer devices are devices that are capable of wireless communications, excluding servers and network elements.

Some existing mobile network architectures will need to be modified to better support such large numbers of peer devices. For example, the existing $3^{rd}$ Generation Partnership Project (3GPP) mobile communication network architecture is designed to support primarily client-server communications. This client-server communication model is used to support both human data communications and M2M communications. However, the client-server model is not optimized to support communications that don't involve a remote server, such as peer-to-peer (P2P) communications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 5 illustrates a forwarding table used for communicating over a peer-to-peer connection in a mobile communication network in accordance with an embodiment.

FIG. 10 illustrates a revised forwarding table used for communicating over a peer-to-peer connection in a mobile communication network after a handover in accordance with an embodiment.

FIG. 12 is a block diagram illustrating internal hardware components of a network element configurable in accordance with some embodiments.

Figure 1:
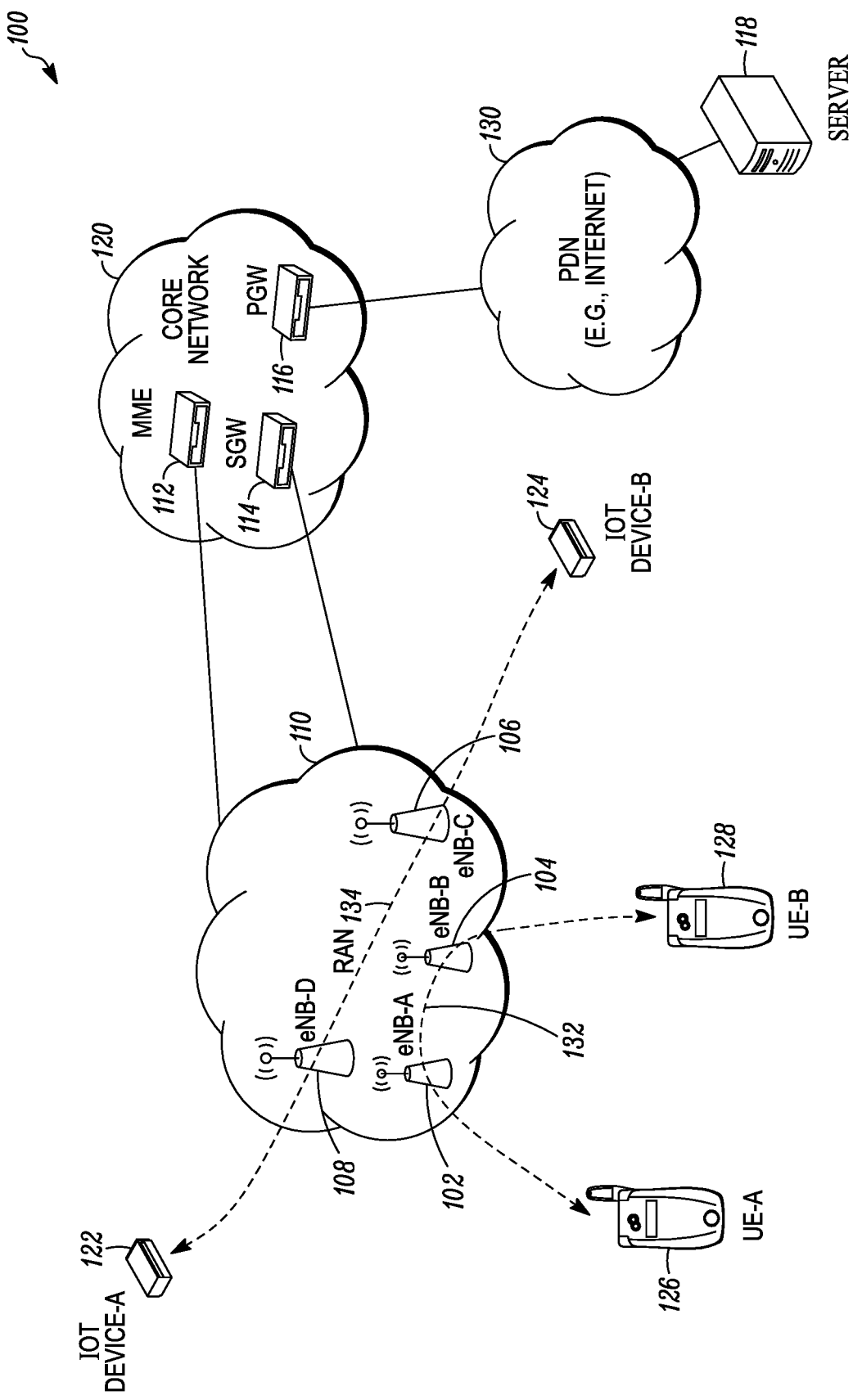
FIG. 1 is a schematic diagram illustrating an environment that supports establishing and communicating over a peer-to-peer connection in a mobile communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Pursuant to the various embodiments are methods and devices for establishing and communicating over a peer-to-peer connection in a mobile communication network. The mobile communication network includes a core network and at least one access network. However, only an access network bearer (referred to in 3GPP networks as a data radio bearer (DRB)) is established, without establishing a set of one or more core network bearers, for communicating data between peer devices over the peer-to-peer connection. Example benefits include efficiency in: offloading the core network; minimizing end-to-end delay in peer-to-peer communications; and supporting new use cases in 3GPP systems, such as cooperative sensor networks, cooperative vehicle-to-vehicle (V2V) applications, and any other use case that involves communicating data between peer devices without using a server.

FIG. 1 illustrates a schematic diagram of an example environment 100 within which may be implemented methods and devices for establishing and communicating over a peer-to-peer connection in a mobile communication network, in accordance with the present teachings. As illustrated, environment 100 includes: a mobile communication network having an access network 110, which in this case is a radio access network (RAN), and a core network 120; a packet data network (PDN) 130; and four peer devices, IoT device-A 122, IoT device-B 124, user equipment (UE)-A 126, and UE-B 128.

The core network 120 includes multiple types of network elements that are collectively used for the overall control of managing the connectivity and location of peer devices and managing the bearers for communication within the mobile communication network. Bearers are logical data paths within the mobile communication network with specific quality of service (QoS) properties. Access network bearers are bearers that terminate at a peer device or a base station, including network resources and interfaces between a peer device and a base station and network resources and interfaces between two base stations. Core network bearers are bearers that terminate at a core network element, including network resources and interfaces between a base station and a core network element and network resources and interfaces between two core network elements. The distribution of functions between the multiple types of network elements of the core network 120 depends on the particular system architecture, as defined, for instance, by a set of protocols implemented in the mobile communication network.

The RAN 110 includes one or more network elements, called base stations in general herein, which are collectively used to provide over-the-air connectivity and connectivity to the core network for the peer devices, including the UE 126 and 128 and the IoT devices 122 and 124. An IoT device is a device having a unique identity, is configured for wireless connectivity to a network such as the RAN 110, and has embedded, therein, circuitry for performing a function such as collecting data, sensing various conditions (e.g., light or motion), activating a door lock, etc. The UE 126 and 128 are representative of a variety of mobile devices including, for example, cellular telephones, personal digital assistants (PDAs), smartphones, laptop computers, tablets, phablets, or other handheld or portable electronic devices. Other types of peer devices include, but are not limited to, devices used in M2M communications, devices used in V2V communications, etc.

The RAN 110 can use any type of radio access technology (RAT) for a peer device to access and communicate using the mobile communication network. The access network 110 can be a cellular access network, having at least one cellular tower or base station for facilitating the establishment of wireless links by one or more peer devices to the access network. Any suitable cellular or cellular-based access technology can be used. Such technologies include, but are not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), etc.; or variants thereof.

The PDN 130 can be, for instance, an enterprise network, an Internet Protocol (IP) Multimedia Subsystem (IMS), the Internet, etc., which has at least one server, e.g., 118. For a particular embodiment, the PDN 130 represents a system of interconnected computer networks that use the standard Transmission Control Protocol (TCP)/IP suite. One example computer network is a network operated by a media service provider, which includes one or more media servers, e.g., a media server 118. The media server 118 stores and shares media or content including, but not limited to, videos such as YouTube videos or movies, audio such as music, picture files, or other static and/or dynamic content, some of which can be HD media.

Additionally, although not shown, environment 100 can further include other networks coupled to and supported by the core network 120 and accessible to the IoT devices 122, 124 and the UE 126, 128. Such networks can include, for example, one or more additional PDNs or one or more Wireless Local Area Networks (WLANs). The WLANs have at least one access point for facilitating wireless links using, for instance, Institute of Electrical and Electronics Engineers (IEEE) 802.11 standards, also referred to in the art as Wi-Fi technology, or using Worldwide Interoperability for Microwave Access (WiMax) technology.

For particular embodiments described herein with respect to FIGS. 2 through 10, the mobile communication network is a 3GPP network, for instance a Long-Term Evolution (LTE) network, wherein the network elements and the peer devices are configured to operate and communicate in accordance with and consistent with one or more 3GPP standards or technical specifications, for instance the LTE specifications or the NexGen or 5G specifications. However, this communication environment 100 implementation is meant only to serve as an example and in no way limit the disclosed embodiments, which might alternatively be implemented using other types of network deployments and associated communication protocols. Additionally, although only UE are referenced in the FIGS. 2 through 10, the teachings can be extended for other types of peer devices establishing and communicating over peer-to-peer connections, such as IoT or M2M devices.

For the illustrated 3GPP network embodiment 100, the RAN network 110 is an Evolved UMTS Terrestrial Radio Access Network (E-UTRANs) having at least one base station, in this case four eNodeBs (eNBs), eNB-A 102, eNB-B 104, eNB-C 106, and eNB-D 108. The base stations serve peer devices, such as the IoT devices 122 and 124 and the UE 126 and 128, by connecting the peer devices to the core network 120 and establishing access network bearers for the peer devices. Alternatively, the RAN 110 is a legacy UTRAN having at least one NodeB. Additionally, although not shown, the RAN 110 can have multiple segments connected by one or more RAN routers (as discussed later), with each RAN segment forming a different IP routing domain. Accordingly, all the peer devices connected to the same RAN segment are allocated IP addresses from the same address space. The core network 120, which serves the RAN 110, is a System Architecture Evolution (SAE) core, also referred to in the art as an Evolved Packet Core (EPC). The EPC subcomponents include a Mobility Management Entity (MME) 112, a Serving Gateway (SGW) 114, a PDN Gateway (PGW) 116, and other subcomponents not shown, such as a Home Subscriber Server (HSS), etc.

For the client-server model of communication in the 3GPP network embodiment 100, the SGW 114 and PGW 116 serve as points of interconnect between the RAN 110, the core network 120, and the PDN 130 to route data packets between one or more peer devices connected to the RAN 110 and the server 118 using at least one PDN connection and associated Evolved Packet System (EPS) bearer. Each EPS bearer has concatenated access network and core network bearers to transport data packets using not only the network elements of the RAN 110 but also using the network elements of the core network 120.

The embodiments described by reference to FIGS. 2 through 10 are, however, directed to establishing peer-to-peer connections and routing data packets over the peer-topeer connections, wherein the routing is performed without using core network bearers and, thereby, without using the SGW 114 and the PGW 116. Accordingly, the data packets sent between the peer devices need not use core network resources for their transmission. A data packet is, in general, a formulated unit or block of data carried by a mobile communication network. The data packets sent over a 3GPP network can be, for instance, Ethernet (layer-2) or IP (layer-3) packets. However, the type and structure of the data packets depends at least in part on the particular network architecture and protocols implemented therein.

Furthermore, the embodiments described by reference to FIGS. 2 through 10 are directed to establishing and communicating over peer-to-peer connections in a 3GPP network. Accordingly, functionality and message exchanges depicted in all the message sequence diagrams (MSDs) and described herein can be implemented alongside some protocols used in 3GPP networks by, for example, modifying existing messaging to add new information elements, changing the functionality of peer devices or network elements, otherwise altering messaging between devices, or some combination thereof. Such protocols can include, but need not be limited to, Non-Access Stratum (NAS) protocols running between the peer devices and the core network and Access Stratum (AS) protocols running between the peer devices and the eNodeBs of which Radio Resource Control (RRC) is an example AS protocol, etc. Some NAS and AS protocols are defined, for instance, in 3GPP TS 23.401.

However, in other embodiments, proprietary protocols can be used alternative to or in addition to modifying standard protocols in order to carry out the present teachings. The particular protocols used, either proprietary or standard, can depend at least in part on the particular network architecture. It should be further understood that each "message exchange," "messaging," or "signaling" depicted as a numbered line with an arrow at one or both ends between two devices of a message sequence diagram can be performed using one or more messages sent between the two devices. Additionally, each "message exchange" is necessarily between two separate devices. Whereas, functionality that can be performed solely within a single physical device is indicated by a numbered block at a single device in the message sequence diagram.

Figure 2:
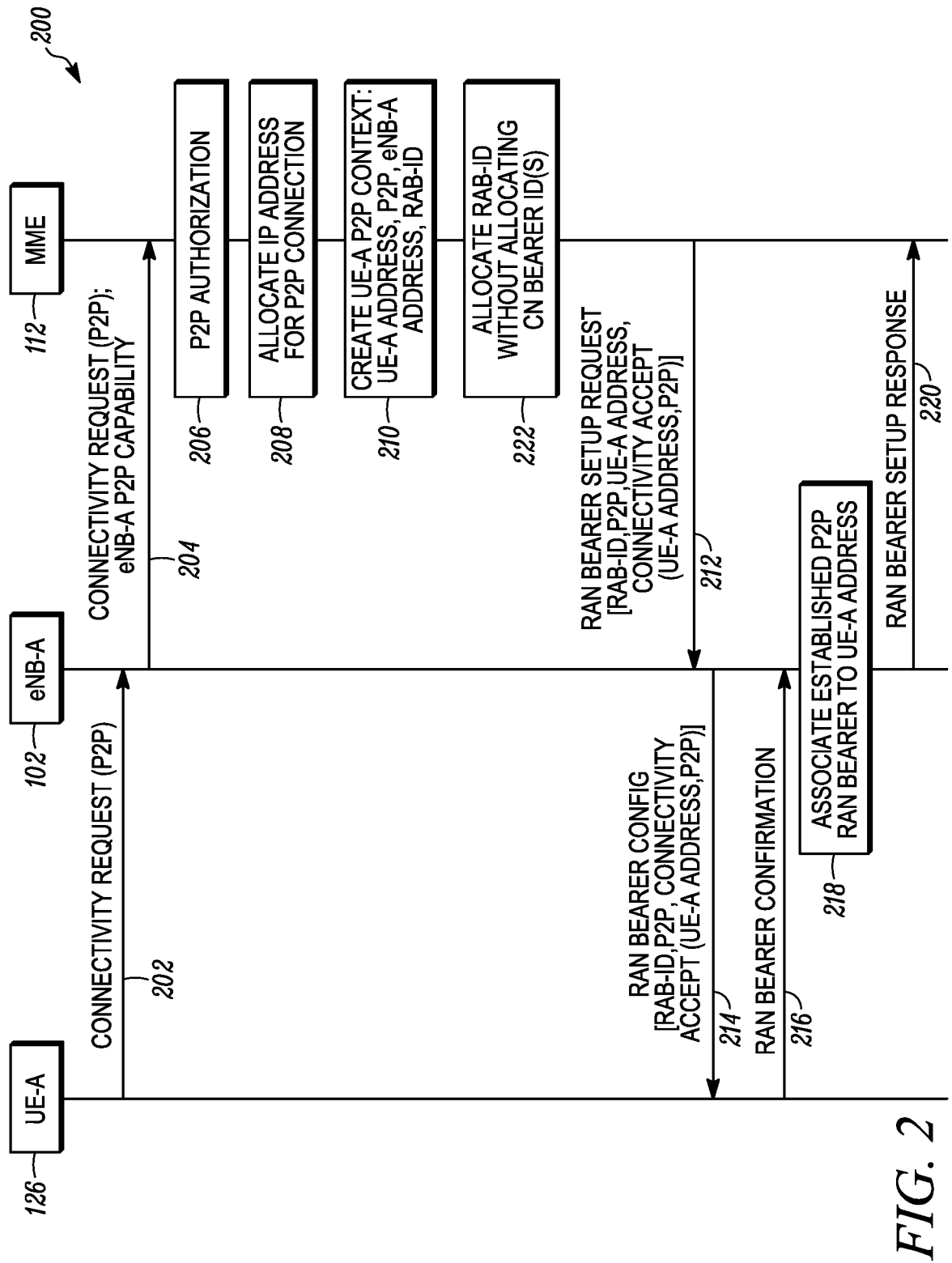
FIG. 2 is a message sequence diagram illustrating collaborative functionality and messaging for establishing a peer-to-peer connection in a mobile communication network in accordance with an embodiment.

FIG. 2 depicts a message sequence diagram 200 illustrating collaborative functionality and messaging for establishing a peer-to-peer connection in a mobile communication network in accordance with an embodiment. Particularly, diagram 200 shows functionality being performed in at least one device and messages being exchanged between two or more of the devices of: the UE-A 126, the eNB-A 102, and the MME 112. For this example message sequence diagram 200, the UE-A initiates establishing a peer-to-peer connection. However, any peer device including any of the other peer devices shown in FIG. 1 can initiate the message sequence diagram 200 to establish a peer-to-peer connection. Moreover, for multiple peer devices to communicate over a P2P connection (such as the UE 126 and 128 over a P2P connection 132 and the IoT devices 122 and 124 over a P2P connection 134) messaging and functionality including or similar to that described by reference to the message sequence diagram 200 is performed for each of the multiple peer devices.

The functionality within the message sequence diagram 200 can by performed after the UE-A has performed an initial attach procedure, e.g., as specified in 3GPP TS 23.401, whereby the UE-A attaches to the mobile communication network. Alternatively, the functionality within the message sequence diagram 200 is performed during the initial attach procedure, wherein a peer-to-peer connection and associated access network bearer is established instead of or in addition to a default PDN connection and associated EPS bearer.

If, for instance, the UE-A has previously established a PDN connection for client-server communication and is in Idle mode, the UE-A performs a Service Request procedure, for example as specified in 3GPP TS 23.401, clause 5.3.4.1, to transition to Connected mode and establish an EPS bearer for the PDN connection. NAS and AS security are established; and the UE-A initiates the message sequence diagram 200. The UE-A can be configured to transition to the Idle mode after being inactive, e.g., not sending or receiving data packets, for a predetermined time period. While a peer device is in the Idle mode, the base station serving the peer device releases at least the access bearers allocated for the peer device. A serving base station or a base station that is (currently) serving a peer device is the base station that is currently used by the peer device. When the peer device is in Active mode, the peer device is connected to the core network 120 through the serving base station. When the peer device is in Idle mode, the peer device is not connected to the core network 120, but it still camps on a radio channel of its serving base station.

According to the message sequence diagram 200, the UE-A initiates the procedure by sending to the eNB-A a connectivity request using messaging 202. The connectivity request includes a "P2P indication" for establishing a P2P connection for the UE-A to communicate data packets with another peer device. As will be seen, a peer-to-peer connection enables multiple peer devices to communicate data packets using an access network bearer without, or which doesn't have, a binding to a core network bearer. The eNB-A forwards the connectivity request to the MME 112 using messaging 204, which the MME 112 receives.

For one embodiment, the eNB-A indicates in the messaging 204 a "P2P capability" of supporting peer-to-peer connections; or, in other words, the eNB-A sends an indication, e.g., an information element, of whether the eNB-A is configured to support peer-to-peer connections, which the MME 112 receives. Accordingly, the MME 112 processes the connectivity request to establish the P2P connection only when the eNB supports P2P communications. Such processing, as will be explained, includes the MME 112 sending an access network bearer setup request to the eNB-A. Otherwise, the MME 112 can ignore the connectivity request or send messaging back to the UE-A denying the connectivity request. Alternatively, the MME 112 is pre-programmed with the P2P capability of each eNB that it servers, e.g., each eNB within its geographical or pool area.

For the example 3GPP implementation, a NAS layer of the UE-A generates a PDN Connectivity Request (as the connectivity request for the MME 112) consistent with 3GPP TS 23.401, clause 5.10.2, which includes the P2P indication. A RRC layer of the UE-A encapsulates the PDN Connectivity Request in a RRC UL Info Transfer message which is forwarded, as the messaging 202, to a corresponding RRC layer of the eNB-A. The P2P indication could be a new PDN type or a special access point name (APN) dedicated to P2P communication, which is included in the PDN Connectivity Request.

At the eNB-A, a S1AP layer encapsulates the PDN Connectivity Request in an S1AP UL NAS Transport message which is forwarded, as the messaging 204, to a corresponding S1AP layer of the MME 112. Where the eNB-A supports P2P communications, the eNB-A can notify the MME 112 by including its P2P capability in the S1AP UL NAS Transport message.

Additionally, the request 202 for establishing the P2P connection can indicate whether to establish the P2P connection as a point-to-point P2P connection or a broadcast P2P connection. A point-to-point P2P connection facilitates P2P communication between the UE-A and one other peer device having a particular allocated address. Whereas, the broadcast P2P connection facilitates P2P communication between the UE-A and multiple other peer devices. For example, when the UE-A desires a broadcast P2P connection, the UE-A can include a layer-2 (e.g., an Ethernet media (or medium) access control (MAC)) address for the UE-A in the connectivity request (e.g., the PDN Connectivity Request) 202. Thus, the absence of the layer-2 address for the UE-A indicates a request for a point-to-point P2P connection. However any suitable information element can be used to indicate the type of P2P connection.

If the eNB-A supports P2P connections, the MME 112 determines 206 whether the UE-A is authorized to establish P2P connections. For example, P2P authorization is confirmed by the MME 112 checking UE-A's subscription data from the HSS. Upon confirming the P2P authorization, the MME 112 proceeds with setting up the P2P connection for the UE-A. Namely, for this example MSD 200, the MME 112 allocates 208 an IP address for the P2P connection. The MME 112 can allocate the IP address alone or with the assistance of another network element, such as a Dynamic Host Configuration Protocol (DHCP) function, which could be part of a RAN Router or implemented as a separate server.

The MME 112 allocates 222 an access network bearer identifier (RAB-ID) for the P2P connection. For the 3GPP LTE embodiment, the RAB-ID is an E-RAB ID. In contrast to establishing a PDN connection, the access network bearer identifier is allocated without allocating a core network bearer identifier. Accordingly, the MME 112 determines, at block 222, to withhold establishing an associated core network bearer in response to receiving the indication for establishing the P2P connection. For the 3GPP LTE embodiment, this means that the MME 112 need not select a PGW and need not send a message to the SGW 114 to create an S1 bearer and an S5 bearer for user-plane traffic.

The MME 112 manages P2P connections for the UE-A. This includes the establishment, maintenance, and release of the bearers associated with the P2P connection, including when the UE-A is in the Idle mode. To facilitate this connection management, the MME 112 creates 210 and maintains a P2P context for the P2P connection. The P2P context includes: at least one address for the UE-A, e.g., either the allocated IP address for a point-to-point P2P connection or both the allocated IP address and the layer-2 address for a broadcast P2P connection; an address for the eNB-A, e.g., an IP address, which is the serving base station; and the allocated access network bearer identifier, e.g., the E-RAB ID.

For this MSD 200 embodiment, when the UE-A is authorized to perform P2P communication and the eNB-A is capable of P2P communication, the MME 112 sends an access network (RAN) bearer setup request to the eNB-A in messaging 212, which is received by the eNB-A. The RAN bearer setup request includes an address for the UE-A and serves as a request for the eNB-A to establish, for the peer-to-peer connection, an access network bearer in the RAN 110 for use in communicating data packets between the UE-A and another peer device, without the use of a core network bearer. Where the P2P connection is a point-to-point connection, the address for the UE-A is the address the MME 112 allocated at block 208. Where the P2P connection is a broadcast connection, the address for the UE-A is the layer-2 address the UE-A provided. Additionally, for the MSD 200 illustrated, the RAN bearer setup request includes the access network bearer identifier (RAB-ID), without including an allocated core network bearer identifier, as one was not assigned. The RAN bearer setup request further includes a connectivity accept response for the UE-A. The connectivity accept response confirms that the MME 112 has initiated the establishment of the peer-to-peer connection.

Responsive to receiving the RAN bearer setup request, the eNB-A sends to the UE-A a RAN bearer configuration message in messaging 214, in order to establish the RAN bearer. The RAN bearer configuration message includes an identifier for the RAN bearer (e.g., the RAB-ID), the P2P indication, and the connectivity accept response from the MME 112. The connectivity accept response within the messaging 214 indicates to the UE-A that the requested P2P connection has been established.

Upon establishing the RAN bearer for the P2P connection, the UE-A sends a confirmation message 216 to eNB-A. Subsequently, the eNB-A associates, links, or otherwise connects 218 the P2P RAN bearer with the UE-A address, for instance using an identifier for the RAN bearer. The eNB-A then sends a RAN bearer setup response to the MME 112 in signaling 220. The RAN bearer setup response is responsive to the RAN bearer setup request 212 and confirms the establishment of the RAN bearer for the P2P connection.

For the example 3GPP LTE implementation of the MSD 200, A NAS layer of the MME 112 generates a PDN Connectivity Accept message (as the connectivity accept response for the UE-A) consistent with the 3GPP TS 23.401, clause 5.10.2. The PDN Connectivity Accept message is responsive to the Connectivity Request sent in messaging 202 from the UE-A. For an example, the PDN Connectivity Accept message includes the P2P indication (e.g., connectivity type=P2P), which indicates to the NAS layer of the UE-A that the connection is a P2P connection. The PDN Connectivity Accept message also includes the IP address allocated, at block 208, for the P2P connection.

The S1AP layer of the MME 112 encapsulates the PDN Connectivity Accept message in an S1AP E-RAB Setup Request (the RAN bearer setup request) which is forwarded, as the messaging 212, to the S1AP layer of the eNB-A. For an example, the E-RAB Setup Request includes the P2P indication, the E-RAB ID, and the UE-A address (the layer-2 address for a broadcast connection or the layer-3 address allocated at block 208 for a point-to-point connection). However the E-RAB Setup Request does not include a SGW S1 TEID (Tunnel Endpoint ID) required to set up an S1 bearer on an S1 interface between the eNB-A and the SGW 114, since no S1 bearer is needed for a P2P connection. For an embodiment, the E-RAB Setup Request also includes a list of allowed or restricted eNBs in case the UE-A is allowed or restricted to use peer-to-peer communications within a limited set of eNBs.

Responsive to the S1AP layer of the eNB-A receiving and processing the S1AP E-RAB Setup Request, the RRC layer of the eNB-A encapsulates the PDN Connectivity Accept message in a RRC Connectivity Reconfiguration message (the RAN bearer configuration message), which is forwarded as the messaging 214 to the RRC layer of the UE-A. The RRC Connectivity Reconfiguration message includes a DRB ID, which can be the E-RAB ID or another identifier from a pool of IDs allocable by the eNB-A, the P2P indication, and the PDN Connectivity Accept message. The PDN Connectivity Accept message is passed to the NAS layer of the UE-A.

After the data radio bearer for the P2P connection is established, the UE-A sends a RRC Connection Reconfiguration Complete message (as the messaging 216) to the eNB-A responsive to the RRC Connection Reconfiguration message received from the eNB-A in messaging 214. Receiving the RRC Connection Reconfiguration Complete message triggers the eNB-A to send a S1AP E-RAB Setup Response (the RAN bearer setup response), in the messaging 220 to the MME 112, in response to the S1AP E-RAB Setup Request received in the messaging 212. The S1AP E-RAB Setup Response includes the E-RAB ID allocated by the MME 112 and confirms to the S1AP layer of the MME 112 that the DRB was established for the P2P connection. Furthermore, for the 3GPP LTE embodiment, the UE-A encapsulates a NAS PDN Connectivity Complete message in an RRC UL Info Transfer message, which the UE-A sends to the eNB-A. The eNB-A forwards the NAS PDN Connectivity Complete message to the MME 112 in a S1AP UL NAS Transport message. The PDN Connectivity Complete message confirms to the NAS layer of the MME 112 that the P2P connection establishment procedure is complete.

Figure 3:
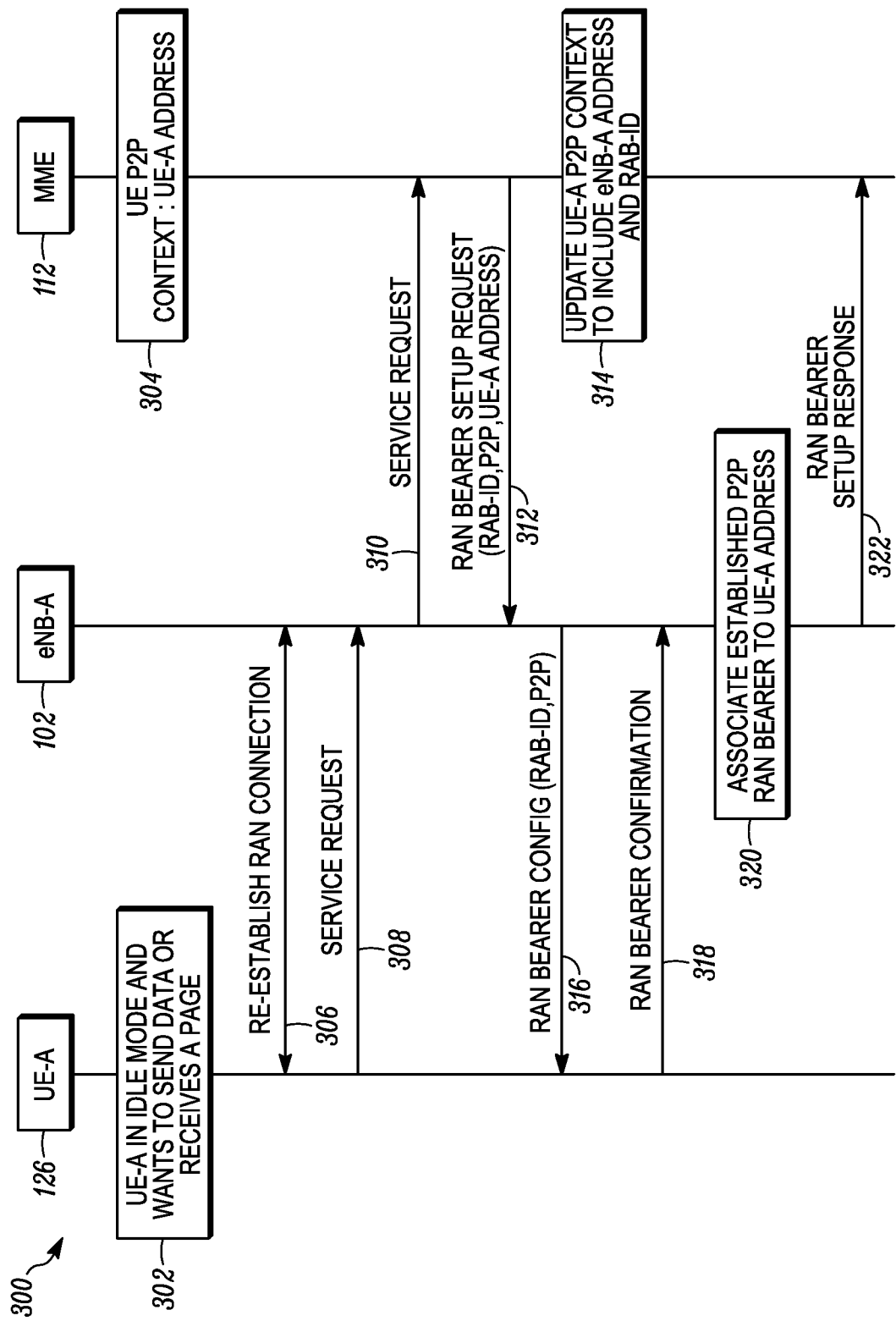
FIG. 3 is a message sequence diagram illustrating collaborative functionality and messaging for establishing a bearer for a peer-to-peer connection for a peer device transitioning from an Idle mode to a Connected mode in a mobile communication network in accordance with an embodiment.

FIG. 3 is a message sequence diagram 300 illustrating collaborative functionality and messaging for establishing a bearer for a peer-to-peer connection for a peer device transitioning from Idle mode to Connected mode in a mobile communication network in accordance with an embodiment. Particularly, diagram 300 shows functionality being performed in at least one device and messages being exchanged between two or more of the devices of: UE-A 126, eNB-A 102, and MME 112. For the 3GPP LTE embodiment, the UE-A is in ECM-Idle mode and transitions to ECM-Connected mode, and the UE-A has previously established a P2P connection.

At block 302, the UE-A is in the Idle mode, and it either wants to send uplink data or it has received a page message from the network. Since the UE-A has previously attached to the 3GPP network and has established a P2P connection, the MME 112 maintains a UE-A P2P context, at block 304, which contains the IP address allocated to UE-A for P2P communication and the layer-2 address of UE-A (when the P2P connection is a broadcast connection). The UE-A P2P context does not include the IP address of an eNB that serves the UE-A or the RAB-ID because the UE-A is in Idle mode.

Using the messaging 306 between the UE-A and the eNB-A, which is the eNB currently serving the UE-A, the UE-A establishes a RAN connection to enable bearers to be established for the UE-A to communicate over the mobile communication network. For example, using the signaling 306, an RRC connection is established using procedures consistent with 3GPP TS 25.331, clause 8.1.3. The UE-A also sends a request for service (a service request) to the eNB-A in messaging 308, which is forwarded by the eNB-A to the MME 112 in messaging 310. The service request serves as a request to establish bearers for any previously established connections, including the peer-to-peer connection that was previously established.

For the 3GPP LTE embodiment, the service request can be a NAS Service Request that the UE-A encapsulates in a RRC Connection Setup Complete message (e.g., a final message of the RRC connection establishment procedures) for forwarding to the eNB-A as the messaging 308. The eNB-A encapsulates the NAS Service Request in a S1AP Initial UE Message for forwarding, as the messaging 310, to the MME 112. For a particular embodiment, the NAS Service Request is encrypted and integrity protected with NAS security context stored in the UE-A and the MME 112. Alternatively, a new security context is established between the UE-A and MME 112 using Authentication and NAS Security Setup procedures.

The service request from the UE-A, triggers the MME 112 to send a RAN bearer setup request, e.g., a S1AP Initial Context Setup Request to the eNB-A, as messaging 312, to request the eNB-A (the eNB currently serving the UE-A) to establish RAN bearers for existing connections, including a RAN bearer for the existing P2P connection. Accordingly, an information element in the RAN bearer setup request identifies the type of connection (P2P), the UE address, and a RAB-ID that the MME 112 has allocated for the RAN bearer. Correspondingly, an E-RAB information element of the S1AP Initial Context Setup Request contains: an allocated E-RAB ID, which could be previously allocated or newly allocated; the P2P indication; and the UE-A address, which is either the allocated IP address or the layer-2 address for the UE-A depending on the type of the P2P connection (point-to-point or broadcast). The MME 112 also updates the P2P context for the UE-A, at block 314, to include the address for the currently serving eNB for UE-A, which is the eNB-A, and the RAB-ID.

Receiving the RAN bearer setup request from the MME 112, triggers the eNB-A to send, as messaging 316 to the UE-A, a RAN bearer configuration message having the RAB-ID and the P2P indication in order to establish the RAN bearer. When the P2P RAN bearer is established, the UE-A sends a confirmation message 318 to eNB-A. Subsequently, the eNB-A associates, links, or otherwise connects the established RAN bearer for the P2P connections to the UE-A address, at block 320, for instance using an identifier for the RAN bearer. This association enables all incoming traffic to the UE-A address to be forwarded to the UE-A over the established P2P RAN bearer. The eNB-A also sends a RAN bearer setup response to the MME 112 in messaging 322. The RAN bearer setup response is responsive to the RAN bearer setup request 312 and indicates the successful establishment of the RAN bearer for the P2P connection. As before, only a RAN bearer is associated with the P2P connection and not any core bearers.

For the 3GPP LTE embodiment, AS Security Setup procedures can be performed between the UE-A and the eNB-A. Receiving the S1AP Initial Context Setup Request triggers the eNB-A to send a RRC Connectivity Reconfiguration message (the RAN bearer configuration message), which is forwarded as the messaging 316 to the UE-A. The RRC Connectivity Reconfiguration message includes a DRB ID, which corresponds to and in some cases can be the E-RAB ID, and the P2P indication. After the data radio bearer for the P2P connection is established, the UE-A sends a RRC Connection Reconfiguration Complete message (as the messaging 318) to the eNB-A responsive to the RRC Connection Reconfiguration message received from the eNB-A in the messaging 316. Receiving the RRC Connection Reconfiguration Complete message triggers the eNB-A to send a S1AP Initial Context Setup Response (the RAN bearer setup response), as the messaging 322 to the MME 112, in response to the S1AP Initial Context Setup Request received in the messaging 312. The S1AP E-RAB Setup Response includes the E-RAB ID allocated by the MME 112 and confirms that the DRB was established for the P2P connection.

Figure 4:
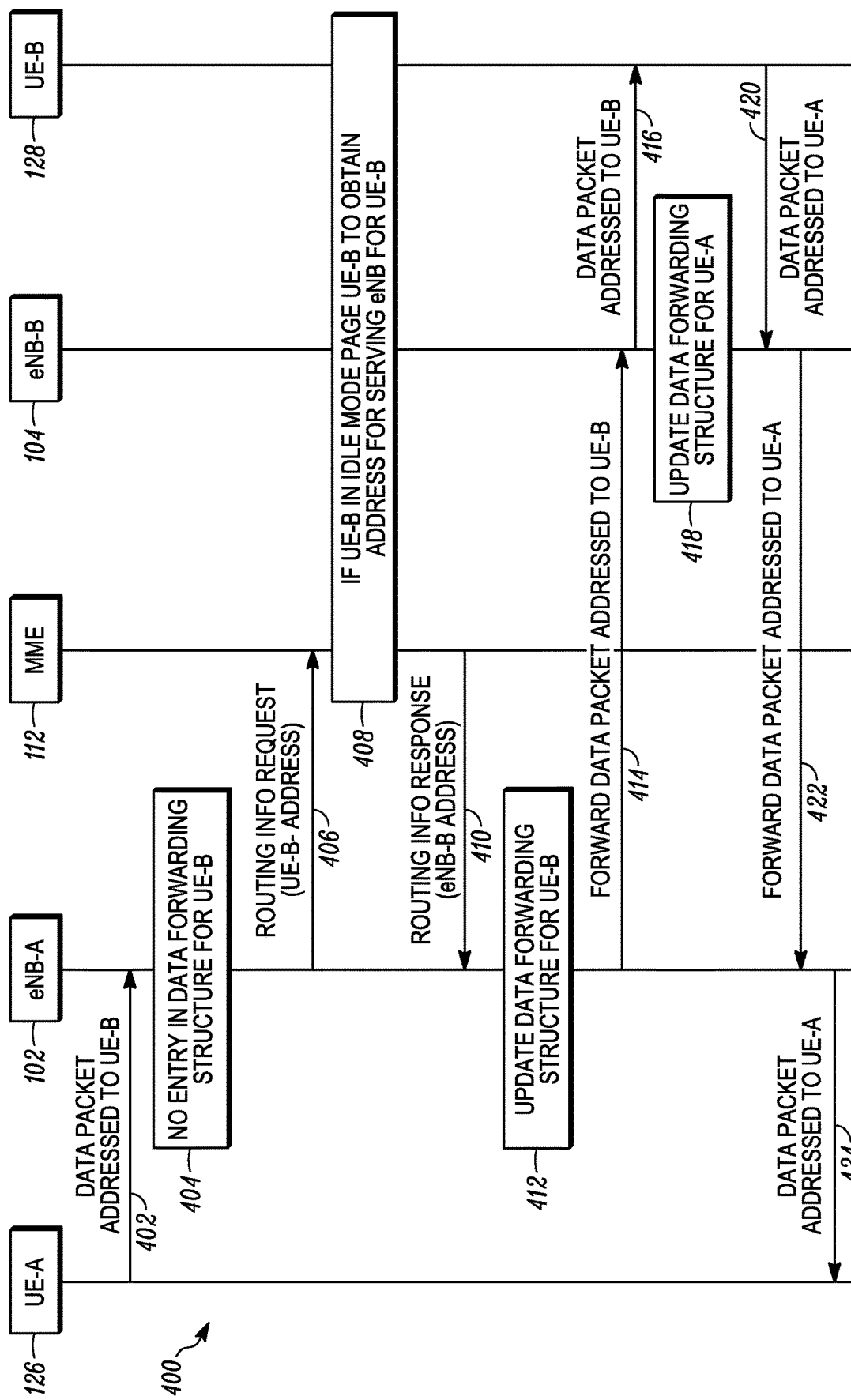
FIG. 4 is a message sequence diagram illustrating collaborative functionality and messaging for communicating over a peer-to-peer connection in a mobile communication network in accordance with an embodiment.

FIG. 4 is a message sequence diagram 400 illustrating collaborative functionality and messaging for communicating over a peer-to-peer connection in a mobile communication network in accordance with an embodiment. Particularly, diagram 400 shows functionality being performed in at least one device and messages being exchanged between two or more of the devices of: UE-A 126, UE-B 128, eNB-A 102, eNB-B 104, and MME 112. The eNB-A currently serves the UE-A, and the eNB currently serves the UE-B. It is assumed that both the UE-A and the UE-B have exchanged messaging with the MME 112 and their respective serving base stations to establish a P2P connection and associated access network bearer (which is unbound to a core network bearer) in accordance with the present teachings, for instance in accordance with the MSD 200.

In accordance with the MSD 400, the UE-A sends 402 to the eNB-A a data packet addressed to the UE-B, which is received by the eNB-A. For example, the data packet has an address of the UE-A as a source address and an address of the UE-B as a destination address. The UE-A sends the data packet to the eNB-A over the access network bearer (e.g., DRB) associated with the P2P connection established for the UE-A.

For one embodiment, the P2P connection is a broadcast connection, and the data packet is a layer-2 packet (e.g., an Ethernet frame) addressed to the UE-B using a layer-2 address. The UE-A can "discover" the layer-2 address for the UE-B using discovery procedures that are consistent with Address Resolution Protocol (ARP) for IPv4, as specified in Request for Comments (RFC) 826, or Neighbor Discovery Protocol for IPv6, as specified in RFC 4861. An example discovery procedure according to the present teachings is described later by reference to FIG. 6. For another embodiment, the P2P connection is a point-to-point connection, and the data packet is a layer-3 packet (e.g., an IP packet) addressed to the UE-B using a layer-3, e.g., IP, address.

The eNB uses a forwarding "structure" such as a table, indexing, or other way of organizing data to retrieve data to assist in forwarding data packets for P2P connections. FIG. 5 illustrates a forwarding table 500 for the eNB-A, which represents some data that can be used for forwarding data packets. The forwarding table 500 includes four columns 502, 504, 506, and 508 and five rows 510, 512, 514, 516, and 518. Row 510 identifies the type of data maintained in each column, namely: peer device in column 502; peer device address in column 504; serving eNB in column 506; and serving eNB address in column 508. Each of rows 512, 514, 516, and 518 denotes an entry in the table for a different peer device, e.g., peer devices UE-B, UE-C (not shown in FIG. 1), UE-D (not shown in FIG. 1), and IoT device-A and contains the data associated with that peer device for each of the columns 504, 506, and 508. It should be noted that, in an embodiment, not all of the information depicted in the table 500 is stored in and used by an eNB. For one example, the eNB stores and uses only data depicted in columns 504 and 510, wherein the columns 502 and 506 are included in the table 500 to facility ease of description.

The eNB-A checks the forwarding table 500 for an entry for the UE-B, as corresponds to the destination address for the UE-B in the data packet. For this particular scenario, the eNB-A determines 404 there is no entry, and correspondingly no address for the serving eNB of the UE-B, in the forwarding table 500. For one example, there was never an entry in the forwarding table 500 for the UE-B. For another example, each entry in the forwarding table 500 exists or is maintained for a pre-determined duration (a lifetime), after which the entry is deleted; and the entry for the UE-B was deleted for lifetime expiry.

The eNB-A can obtain information from the MME 112 to create the entry 512 for the UE-B in the forwarding table 500. More particularly, the eNB-A sends 406 a Routing Info Request to the MME 112 including the address of the UE-B, which serves as a request for an address for a serving eNB for the UE-B. If the UE-B is in Connected mode, the MME 112 has stored the IP address of the eNB-B, which is currently serving the UE-B. However, if the MME 112 determines that the UE-B is in Idle mode, the Routing Info Request triggers the MME 112 to begin paging 408 the UE-B in the appropriate tracking area. This triggers the UE-B to conduct the Service Request procedure, for example, as described by reference to FIG. 3, and transition to Connected mode.

During the Service Request procedure, the MME 112 learns that the UE-B is currently served by the eNB-B. If the MME 112 maintains a P2P context for the UE-B, the MME 112 updates this P2P context to include the address obtained for the eNB-B. The MME sends 410 to eNB-A the IP address of the eNB-B within a Routing Info Response message. In turn, the eNB-A updates 412 the forwarding table 500 with the entry 512 for the UE-B and associates the address for the eNB-B with the address for the UE-B. For a further embodiment, the IP addresses used for inter-eNB communication are different (e.g. they belong to different IP networks) from the IP addresses allocated to UEs for P2P communication.

The eNB-A then uses the address for the eNB-B that it obtained from the MME 112 to "directly" forward 414 the data packet to the eNB-B for the UE-B, e.g., without using a core network bearer. More particularly, to forward 414 the data packet to the eNB-B for the UE-B, the eNB-A encapsulates the layer-2 packet (Ethernet frame) or the layer-3 (IP) packet from UE-A and addressed to the UE-B into a layer 3 (IP) packet and sends 414 the IP packet to the eNB-B. The eNB-B forwards 416 the inside data packet (e.g., the Ethernet frame or IP packet) to the UE-B using the access network bearer (e.g., DRB) established for a P2P connection for the UE-B. The appropriate P2P DRB is determined from the destination address in the data packet. In addition, the eNB-B updates 418 its own forwarding table such that an entry for the UE-A is associated with the address for the eNB-A so that data packets having the address of the UE-A as the destination address, e.g., messaging 420, are forwarded 422 to the eNB-A for delivery 424 to the UE-A.

As mentioned earlier, the RAN 110 can have multiple segments, for instance with each segment having a different routing domain. For one example, the eNB-A and eNB-B are in the same first RAN segment. Accordingly, the data packet from the UE-A is forwarded 414 within the first RAN segment. For another example, the first segment of the RAN includes the eNB-A, and the data packet is forwarded 414 through at least one RAN router to a second segment of the RAN that includes the second base station, eNB-B. Conventional IP routing can be performed by RAN routers that link different RAN segments together.

Figure 6:
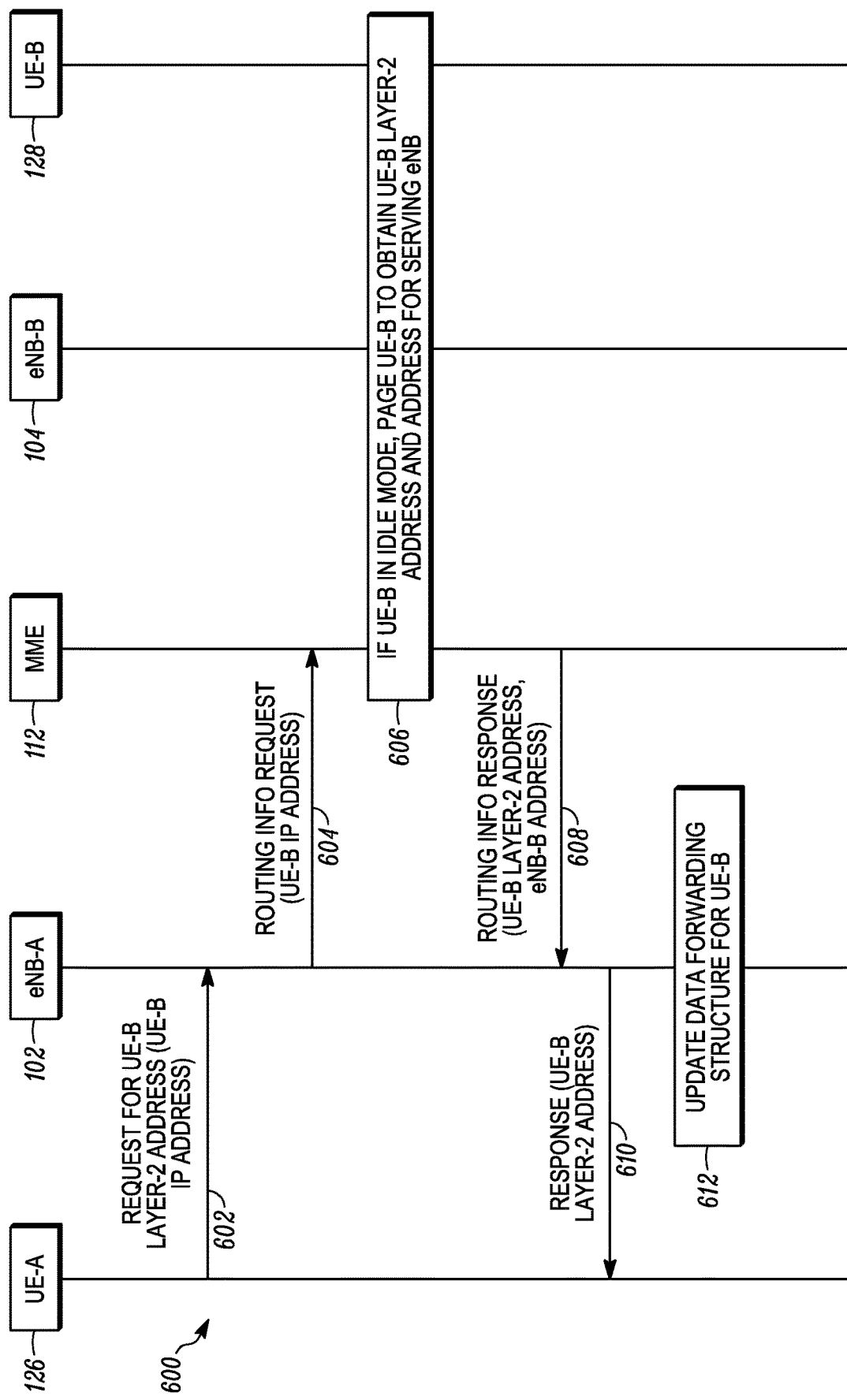
FIG. 6 is a message sequence diagram illustrating collaborative functionality and messaging for performing a discovery procedure to obtain a layer-2 address for communicating over a peer-to-peer connection in a mobile communication network in accordance with an embodiment.

FIG. 6 is a message sequence diagram 600 illustrating collaborative functionality and messaging for performing a discovery procedure to obtain a layer-2 address for communicating over a peer-to-peer connection in a mobile communication network in accordance with an embodiment. Particularly, diagram 600 shows functionality being performed in at least one device and messages being exchanged between two or more of the devices of: UE-A 126, UE-B 128, eNB-A 102, eNB-B 104, and MME 112.

As mentioned before, the P2P connection for a UE may be broadcast connection. In this case, a UE can use the discovery procedure illustrated by reference to MSD 600 to discover the layer-2 address of other UE. For example, the eNB-A receives 602 from the UE-A a request to obtain the layer-2 address for the UE-B. The request to obtain the layer-2 address includes a layer-3 address for the UE-B. For an IPv4 implementation, the request to obtain the layer-2 address is an ARP Request. For an IPv6 implementation, the request to obtain the layer-2 address is a Neighbor Solicitation. The ARP Request is a broadcast message that terminates at the eNB-A in order to avoid broadcasting within a typically non-broadcast RAN 110. The Neighbor Solicitation is a multicast message that also terminates at the eNB-A, for the same reason.

Accordingly, the eNB-A intercepts this message and transmits 604 a Routing Info Request to the MME 112 in order to discover the layer-2 address of the UE-B as well as the address of the eNB (in this case eNB-B) that currently serves this UE. The Routing Info Request contains the UE-B layer-3 address. If the MME 112 determines that the UE-B is in Connected mode, the MME 112 obtains the layer-2 address of the UE-B and the address of the eNB from a stored context for the UE-B and sends 608 this information to the eNB-A in a Routing Info Response.

However, if the MME 112 determines that the UE-B is in Idle mode, the MME 112 starts paging 606 the UE-B in the appropriate tracking area. This triggers the UE-B to conduct the Service Request procedure, for example, as described by reference to FIG. 3, and transition to Connected mode. During the Service Request procedure, the MME 112 learns that the UE-B is currently served by the eNB-B (and the eNB-B address) and learns the layer-2 address for the UE-B, which the MME 112 sends 608 to the eNB-A in the Routing Info Response. In turn, the eNB-A sends 610 the UE-B layer-2 address in a response to the UE-A's request for the layer-2 address for the UE-B. The eNB-A also updates 612 its forwarding table 500 with the layer-2 address for the UE-B and associates the address for the eNB-B with the layer-2 address.

Figure 7:
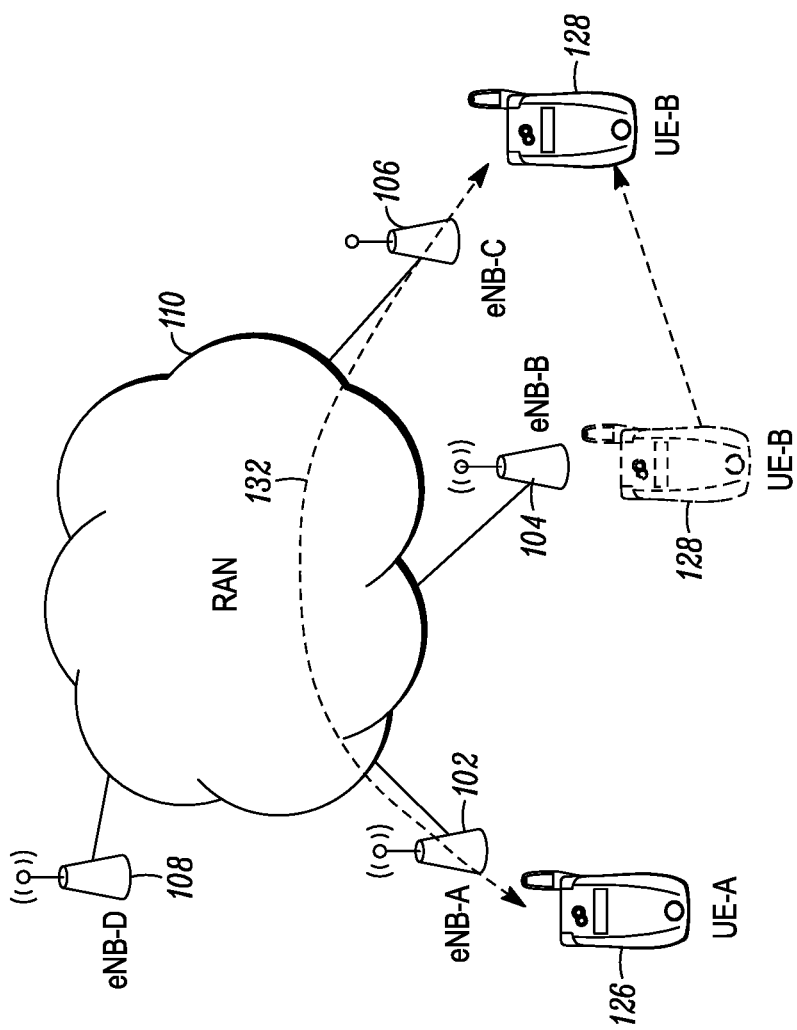
FIG. 7 is a schematic diagram illustrating a handover within a mobile communication network that supports establishing and communicating over a peer-to-peer connection in accordance with an embodiment.
Figure 8:
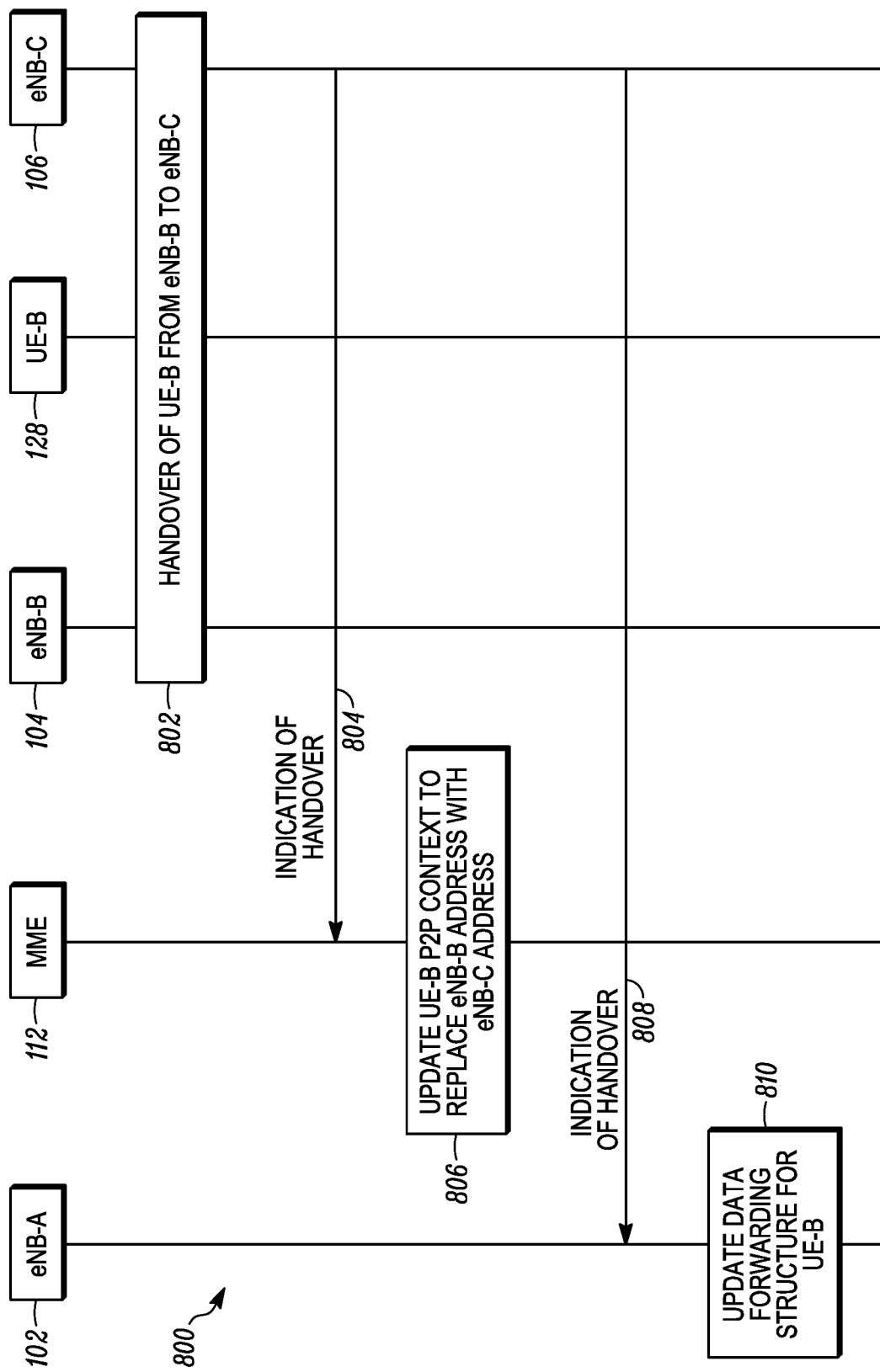
FIG. 8 is a message sequence diagram illustrating collaborative functionality and messaging for updating routing information, after a handover, for use in communicating over a peer-to-peer connection in a mobile communication network in accordance with an embodiment.
Figure 9:
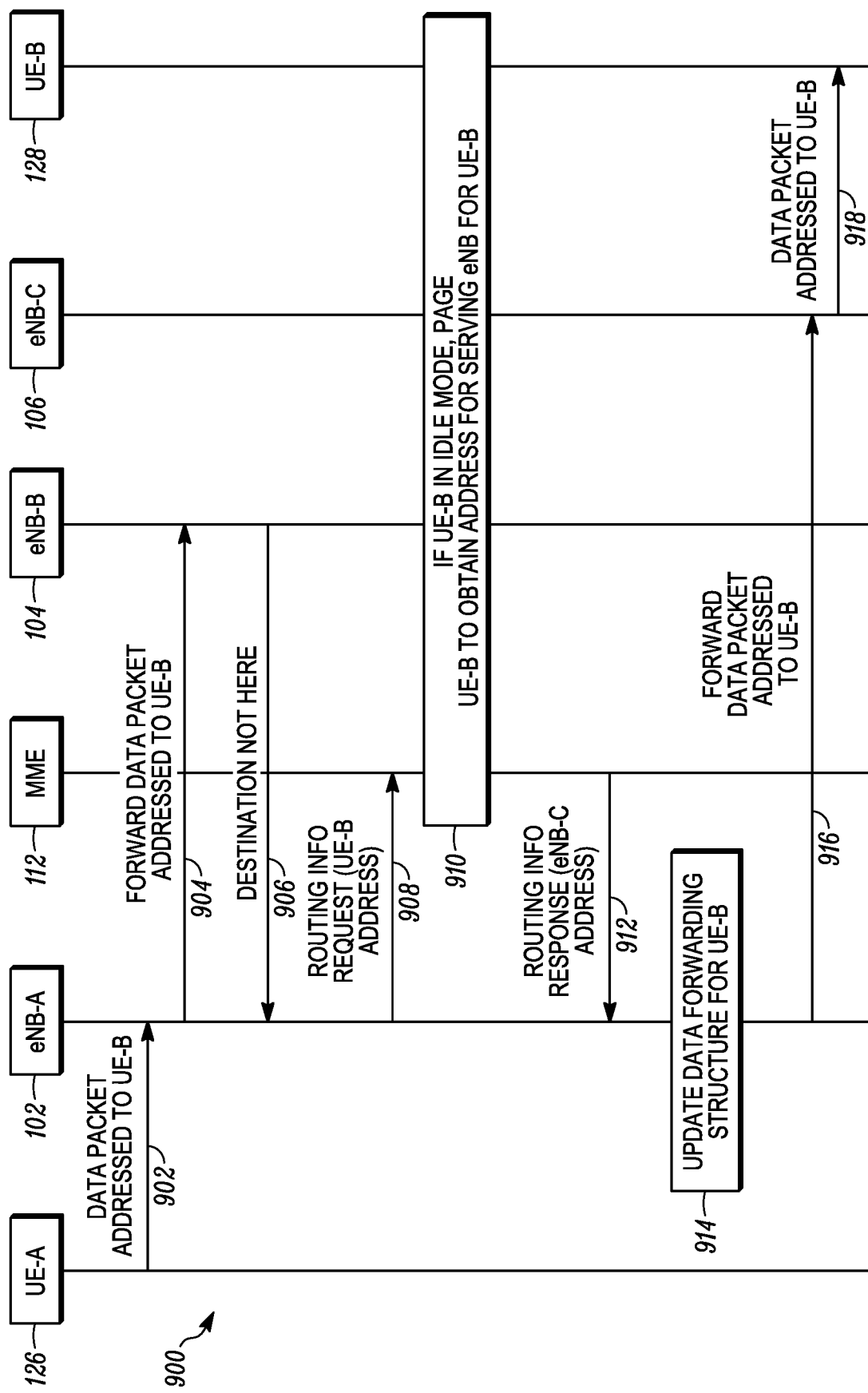
FIG. 9 is a message sequence diagram illustrating collaborative functionality and messaging for communicating over a peer-to-peer connection in a mobile communication network after a handover in accordance with an embodiment.

FIGS. 8 and 9 illustrate embodiments of message sequence diagrams directed to messages exchanged and functionality performed after a handover of a UE from one base station to another base station, in accordance with the present teachings. The embodiments are described with respect to a handover of the UE-B from the source eNB-B to the target eNB-C, as shown in FIG. 7, wherein the eNB-C becomes the base station currently serving the UE-B. Accordingly, the resulting P2P connection 132 between the UE-A and the UE-B goes through the eNB-A and the eNB-C.

FIG. 8 is a message sequence diagram 800 illustrating collaborative functionality and messaging for updating routing information, after a handover, for use in communicating over a peer-to-peer (P2P) connection in a mobile communication network in accordance with an embodiment. Particularly, diagram 800 shows functionality being performed in at least one device and messages being exchanged between two or more of the devices of: UE-B 128, eNB-A 102, eNB-B 104, eNB-C 106, and MME 112.

As shown, a handover procedure 802 is performed to handover the UE-B from the eNB-B to the eNB-C. For example, an intra E-UTRAN handover (or X2 handover) is performed consistent with the 3GPP TS 36.300. The eNB-C sends to the MME 112 in messaging 804 and sends to the eNB-A in messaging 808 an indication of the handover. For example, the indication to the MME 112 of the handover can be a S1AP Path Switch Request consistent with the 3GPP TS 36.300, which is sent as the messaging 804.

The indication to the eNB-A in the messaging 808 can be a proprietary message or a new message added to a 3GPP TS, such as the 3GPP TS 36.300. For a further embodiment, as part of the handover procedure 802, the eNB-C sends to all eNB in its forwarding table and/or all the eNB in the forwarding table of the eNB-B (as communicated by the eNB-B to the eNB-C) an indication that it is the eNB currently serving the UE-B. Messaging 808 is correspondingly part of the indications sent to all such eNB.

The MME 112 updates 806 a P2P context for the UE-B to replace the address for the eNB-B with the address for the eNB-C, received in the messaging 804. Similarly, the eNB-A updates 810 its forwarding table, e.g., the forwarding table 500, to associate the address for the eNB-C, received in the messaging 808, with the UE-B address. For example, as shown in FIG. 10, the eNB-A updates the entry 512 for the UE-B by updating the serving eNB information 1002 and the serving eNB address information 1004.

Additionally, for the embodiment illustrated in FIG. 8, the indication, from the eNB-C to the eNB-A that the eNB-C is the serving base station for the UE-B, is messaging sent directly in response to the handover 802 of the UE-B from the eNB-B to the eNB-C. Alternatively, when the eNB-C forwards a data packet to the eNB-A from the UE-B for delivery to the UE-A, the eNB-A updates 810 the entry 512 for the UE-B. For this embodiment, the indication of the handover in the messaging 808 is essentially the data packet from the UE-B addressed to the UE-A as opposed to a message sent in response to the handover.

FIG. 9 is a message sequence diagram 900 illustrating collaborative functionality and messaging for communicating over a peer-to-peer (P2P) connection in a mobile communication network after a handover in accordance with an embodiment. Particularly, diagram 900 shows functionality being performed in at least one device and messages being exchanged between two or more of the devices of: UE-A 126, UE-B 128, eNB-A 102, eNB-B 104, eNB-C 106, and MME 112.

For this embodiment, a handover has been performed of the UE-B from the eNB-B to the eNB-C. However, the eNB-A has not updated its forwarding table 500, and the forwarding table 500 has the entry 512 for the UE-B as shown in FIG. 5, for instance. Accordingly, when the eNB-A receives 902 a data packet addressed to the UE-B, the eNB-A forwards 904 the data packet to the eNB-B, as per its forwarding table 500. Because of the handover, the eNB-A receives 906 an indication, e.g., a Destination Not Here message or any other suitable messaging or information element within a message, that the eNB-B is no longer the serving base station for the UE-B.

Accordingly, the eNB-A obtains (e.g., 908, 910, 912) from the MME 112 the address for the base station currently serving the UE-B, in this instance the address for the eNB-C. The eNB-A updates 914 its forwarding table 500 for the UE-B to replace the address for the eNB-B with the address for the eNB-C. For example, as shown in FIG. 10, the eNB-A updates the entry 512 for the UE-B by updating the serving eNB information 1002 and the serving eNB address information 1004. The eNB-A forwards 916 the data packet addressed to the UE-B to the eNB-C, which sends 918 the data packet to the UE-B.

To obtain the address for the eNB-C in the 3GPP LTE embodiment, the eNB-A transmits 908 a Routing Info Request to the MME 112 in order to discover the address of the eNB (in this case eNB-C) that currently serves the UE-B. The Routing Info Request contains the UE-B address. If the MME 112 determines that the UE-B is in Connected mode, the MME 112 obtains the address of the eNB-C from a stored context for the UE-B and sends 912 this information to the eNB-A in a Routing Info Response.

However, if the MME 112 determines that the UE-B is in Idle mode, the Routing Info Request triggers the MME 112 to page 910 the UE-B in the appropriate tracking area. This triggers the UE-B to conduct the Service Request procedure, for example, as described by reference to FIG. 3, and transition to Connected mode. During the Service Request procedure, the MME 112 learns that the UE-B is currently served by the eNB-C and learns the eNB-C address, which the MME 112 sends 912 to the eNB-A in the Routing Info Response.

Figure 11:
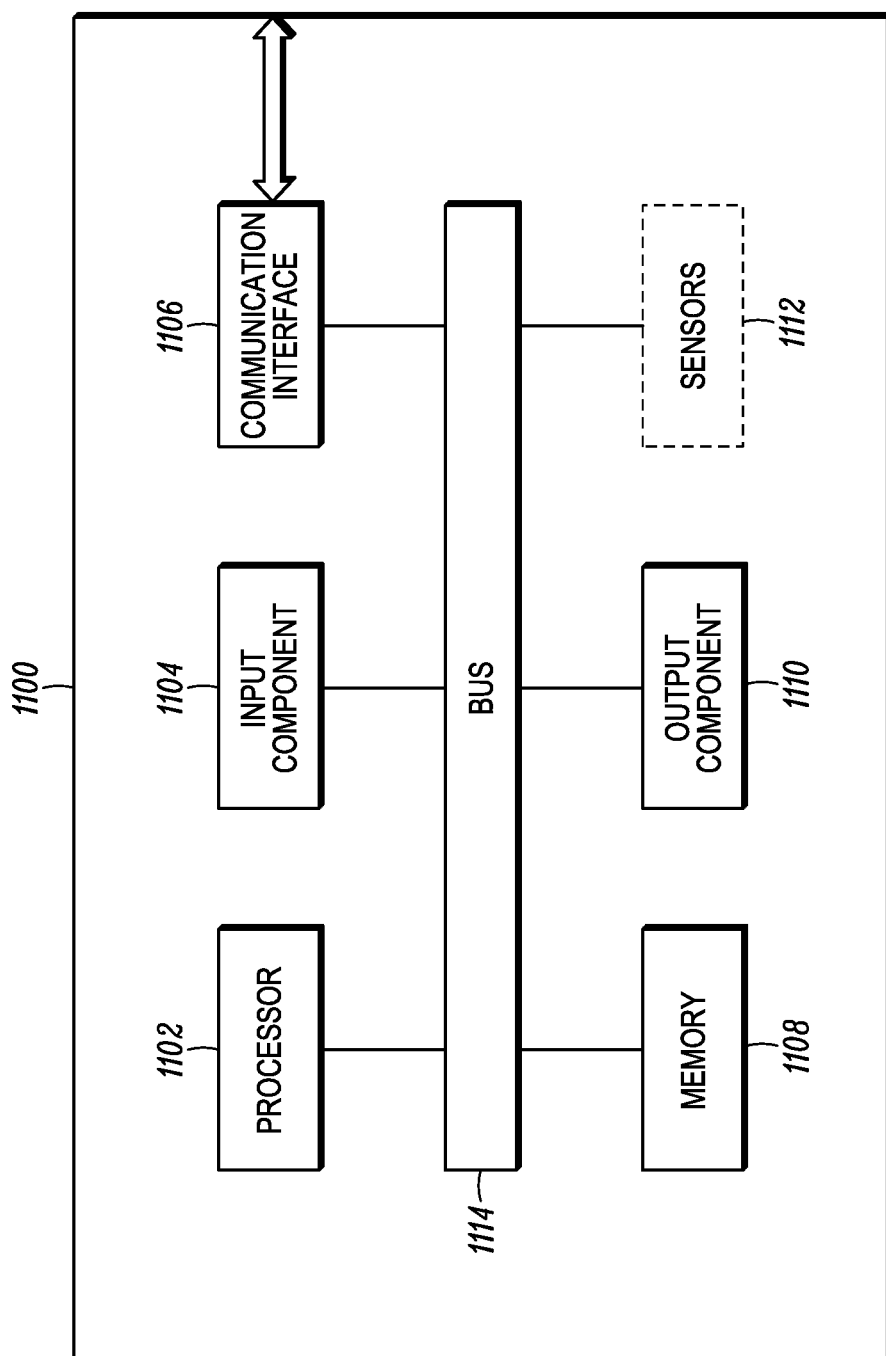
FIG. 11 is a block diagram illustrating internal hardware components of a peer device configurable in accordance with some embodiments.

FIG. 11 shows a block diagram illustrating example internal hardware components of a peer device 1100, for example IoT devices 122 and 124 and UE 126 and 128 as illustrated in FIG. 1, which can be configured to facilitate implementation of embodiments according to the present teachings. "Adapted," "operative," "capable" or "configured," as used herein, means that the indicated device or components are implemented using one or more hardware elements, which may or may not be programmed with software and/or firmware as the means for the indicated components to implement their desired functionality, for example using algorithms consistent with the message sequence diagrams and tables illustrated and described by reference to FIGS. 2 through 10.

As shown in FIG. 11, the internal hardware elements or components of the device 1100 include at least one of each of a processor 1102, an input component 1104, a communication interface 1106, a memory component 1108, an output component 1110, and optionally a set of sensors 1112. As further illustrated, the internal components of the device 1100 are operatively coupled to one another, and in communication with one another, by way of one or more internal communication links 1114, for instance an internal bus. A limited number of device components 1102, 1104, 1106, 1108, 1110, 1112, and 1114 are shown for ease of illustration, but other embodiments may include a lesser or greater number of such components in the device 1100. Moreover, other well-known elements needed for a commercial embodiment of the device 1100 may be omitted from FIG. 11 for brevity.

We now turn to a brief description of the components within the peer device 1100. The communication interface 1106 allows for communication between the peer device 1100 and other electronic devices, such as a server, a network element, or another peer device. For one embodiment, the communication interface 1106 includes one or more wireless transceivers such as a cellular transceiver, a WLAN transceiver, and a Global Positioning System (GPS) transceiver. More particularly, the cellular transceiver is configured to implement any suitable cellular or cellular-based technology to conduct cellular communications of data over a cellular network. The WLAN transceiver can be a Wi-Fi transceiver configured to conduct Wi-Fi communications over a Wi-Fi network, in accordance with IEEE 802.11 (e.g., a, b, g, n, or ac) standards. The communication interface 1106 can also include one or more wireless transceivers configured to implement device-to-device D2D communications using technology such as LTE Direct, Wi-Fi Direct, Wi-Fi Aware, Bluetooth low energy (BLE), etc. Where, for instance, the device 1100 is a fixed device, the communication interface 1106 can include a wired communication interface used to communicate through a cable modem or a digital subscriber line (DSL).

The processor 1102 includes arithmetic logic and registers necessary to perform the digital processing required by the device 1100 to, for example, establish and communicate over peer-to-peer connections in a manner consistent with the embodiments described herein. For one embodiment, the processor 1102 represents a primary microprocessor or central processing unit (CPU) of the device 1100 such as an application processor of a smartphone. In another embodiment, the processor 1102 represents a baseband processor or other ancillary or standalone processor to the CPU that is used by one or more wireless transceivers. Depending, at least in part, on the particular function being performed and a given device 1100 design, various functionality or protocols, such as 3GPP standard protocols may be executed by the processor 1102 in hardware or as software or firmware code.

For one example, the processor 1102 implements a protocol stack or protocol suite having multiple "layers" that each have, include, contain, or implement one or more protocols, procedures, and/or algorithms that enable various functionality of the device 1100. For example, for 3GPP networks, a control plane protocol stack includes, among other layers: a NAS layer that implements the NAS protocols and communicates with a corresponding NAS layer of an MME; an AS layer that implements the AS protocols including the RRC protocol and communicates with a corresponding RRC layer of a serving base station (e.g., eNodeB or NodeB), wherein the RRC protocol can also be viewed as implemented by an RRC layer of an AS protocol stack; and a MAC layer, e.g., part of layer-2 of the seven-layer Open Systems Interconnection (OSI) model, which communicates with a corresponding MAC layer of the serving base station. Additionally, for 3GPP networks, a user plane protocol stack includes, among other layers: an application layer that communicates with a corresponding application layer of another peer device or a server; an IP layer (layer-3, e.g., of the OSI model) that communicates with a corresponding IP layer of the serving base station and a PGW; and a MAC layer that communicates with the MAC layer of the serving base station.

For an embodiment, the input component 1104 includes: one or more visual input components such as a camera lens and photosensor; one or more acoustic receiver or audio input components such as one or more transducers (e.g., microphones); and one or more mechanical input components such as a touchscreen display, a flip sensor, a keyboard, a keypad selection button, and/or a switch. Moreover, the output component 1110 can include: one or more visual output components such as a liquid crystal display and/or a light emitting diode indicator; one or more audio output components such as a speaker, an alarm, and/or a buzzer; and one or more mechanical output components such as a vibrating mechanism. The sensors 1112 can be arranged within a sensor hub to manage one or more functions of the sensors. Example sensors 1112 include, but are not limited to, proximity sensors (e.g., a light detecting sensor, an ultrasound transceiver, or an infrared transceiver), touch sensors, altitude sensors, an accelerometer, a tilt sensor, and a gyroscope, to name a few.

The memory component 1108 represents one or more memory elements of any of a variety of forms, for example read-only memory, random access memory, static random access memory, dynamic random access memory, etc. In an embodiment, the processor 1102 uses the memory component 1108 to store and retrieve data. In some embodiments, the memory component 1108 is integrated with the processor 1102 into a single component such as on an integrated circuit. However, such a single component still usually has distinct portions/sections that perform the different processing and memory functions. The data that is stored by the memory component 1108 includes, but need not be limited to, operating systems, programs (e.g., applications, protocols, and other code), and informational data, such as peer-to-peer contexts and forwarding tables.

For an embodiment, the peer device 1100 is configured, e.g., by the operative coupling and collective configuration of its processor 1102 and communication interface 1106, to establish a peer-to-peer connection in accordance with the described embodiments. Namely, the peer device 1100 sends (e.g., 202), to a base station of an access network for a network element of a core network, a connectivity request that includes an indication for establishing a peer-to-peer connection for the peer device 1100 to communicate data packets with another peer device over the access network using an access network bearer without a binding to a core network bearer. The peer device 1100 receives (e.g., 214), from the base station, an access network bearer configuration message to establish the access network bearer for the requested peer-to-peer connection. The peer device 1100 further sends (e.g., 216), to he base station, a confirmation that the access network bearer has been established.

FIG. 12 shows a block diagram illustrating example internal hardware components of a network element 1200, for example an the eNodeB 102, 104, 106, or 108 or the MME 112 as illustrated in FIG. 1. As shown in FIG. 12, the internal hardware elements or components of the network element 1200 include at least one of each of a processor 1202, a communication interface 1204, and a memory component 1206. As further illustrated, the internal components of the network element 1200 are operatively coupled to one another, and in communication with one another, by way of one or more internal communication links 1208, for instance an internal bus. As such, the network element 1200 is configurable through one or more of its device components 1202, 1204, 1206, and 1208 to operate, for instance, as a MME or eNodeB to implement algorithms consistent with the message sequence diagrams and tables illustrated and described by reference to FIGS. 2 through 10.

A limited number of device components 1202, 1204, 1206, and 1208 are shown for ease of illustration, but other embodiments may include a lesser or greater number of such components in the network element 1200. Moreover, other well-known elements needed for a commercial embodiment of the network element 1200 may be omitted from FIG. 12 for brevity.

In general, at a hardware level, the device components 1202, 1204, 1206, and 1208 function as described for the analogous device components 1102, 1106, 1108, and 1114, respectively, shown in FIG. 11. However, one or more of the device components 1202, 1204, 1206, or 1208 may have some additional features. The communication interface 1204, for example, might support more simultaneous connections than the communication interface 1106, and the processor 1202 might be configured for a greater computational load as compared to the processor 1102.

Additionally, for 3GPP networks, a control plane protocol stack for a base station includes, among other layers (some of which have already been mentioned), a S1AP layer that communicates with a corresponding S1AP layer of a MME. A user plane protocol stack for a base station includes, among other layers (some of which have already been mentioned): an IP layer that communicates with a corresponding IP layer of another base station or a SGW; a layer-2 that communicates with a corresponding layer-2 of another base station or a SGW.

For a particular embodiment, the network element 1200 is configured, e.g., by the operative coupling and collective configuration of its processor 1202 and communication interface 1204, to forward data packets using a peer-to-peer connection. Namely, a base station 1200 receives a data packet from a first peer device over an access network bearer established for a peer-to-peer connection for the first peer device. The data packet is addressed to a second peer device, and the access network bearer is unbound to a core network bearer. The base station 1200 forwards the data packet to a second base station currently serving the second peer device. The forwarding is using an access network bearer established for a peer-to-peer connection for the second peer device. The forwarding is without using a core network bearer. For another embodiment, the base station 1200 uses the memory element 1206 to store a forwarding table that associates an address for the second base station to the address for the second peer device for forwarding the data packet to the second peer device.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

It is claimed:

1. A network element of a core network comprising: a processor and a communication interface operatively coupled and collectively configured to:
   receive a connectivity request for a first peer device, wherein the connectivity request includes an indication for establishing a peer-to-peer connection for the first peer device served by a first base station to communicate data packets with a second peer device served by a second base station;
   allocate a first access network bearer identifier without allocating a core network bearer identifier; and
   send, to the first base station of an access network, a first access network bearer setup request, which includes:
   the first access network bearer identifier without including an allocated core network bearer identifier; and
   an address for the first peer device,
   wherein a layer-2 address provided by the first peer device with the connectivity request is used as the address for the first peer device,
   wherein the first access network bearer setup request serves as a request for the first base station to establish, for the peer-to-peer connection, a first access network bearer in the access network for use in communicating the data packets with the second peer device via the first and second base stations, and without the use of a core network bearer, and
   wherein the first access network bearer setup request is sent while the first peer device and the second peer device are not in communication.

2. The network element of claim 1, wherein the processor is further configured to allocate the address for the first peer device.

3. The network element of claim 1, wherein the connectivity request indicates to establish the peer-to-peer connection as a broadcast connection.

4. The network element of claim 1, wherein the processor and the communication interface are further configured to receive an indication of whether the first base station is configured to support peer-to-peer connections, wherein the first access network bearer setup request is sent when the first base station supports peer-to-peer connections.

5. The network element of claim 1, wherein the processor is further configured to determine whether the first peer device is authorized to establish peer-to-peer connections, wherein the first access network bearer setup request is sent when the first peer device is authorized to establish peer-to-peer connections.

6. The network element of claim 1, wherein the processor is further configured to create a peer-to-peer context for the first peer device that includes the address for the first peer device, an address for the first base station, and the first access network bearer identifier.

7. The network element of claim 6, wherein the first peer device has transitioned to an idle mode.

8. The network element of claim 7, wherein the processor and the communication interface are further configured to:
   receive, from a base station currently serving the first peer device, a request to establish a bearer for the established peer-to-peer connection; and
   send, to the base station currently serving the first peer device, a second access network bearer request that includes the address for the first peer device and a second access network bearer identifier and serves as a request for the base station currently serving the first peer device to establish a second access network bearer for the established peer-to-peer connection.

9. The network element of claim 8, wherein the processor is further configured to update the peer-to-peer context for the first peer device to include an address of the base station currently serving the first peer device and the second access network bearer identifier.

10. The network element of claim 6, wherein the processor and the communication interface are further configured to:
   receive an indication from a second base station of a handover of the first peer device from the first base station to the second base station, which is the base station currently serving the first peer device; and update the peer-to-peer context to replace the address for the first base station with an address for the second base station.

11. The network element of claim 1, wherein the processor and the communication interface are further configured to determine to withhold establishing the core network bearer in response to receiving the indication for establishing a peer-to-peer connection.

12. The network element of claim 1, wherein the first access network bearer setup request includes a connectivity accept response for the first peer device, and wherein the connectivity accept response confirms that the network element has initiated the establishment of the peer-to-peer connection.

* * * * *